3,362,542
SAND TRAP
Jack Stevens, 4415½ E. Fort Lowell St.,
Tucson, Ariz. 85716
Filed Oct. 14, 1965, Ser. No. 495,806
2 Claims. (Cl. 210—521)

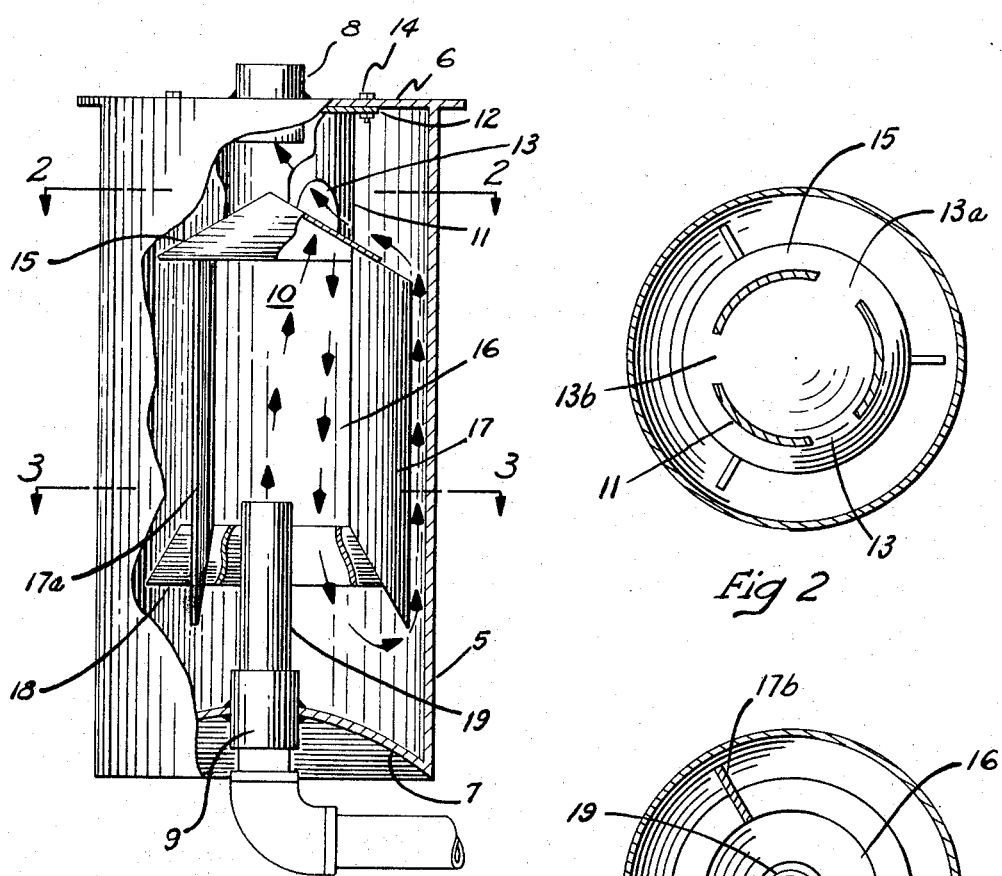

This invention relates to improvements in apparatus for separating entrained sand and other granular particles from water and other liquids, and more particularly relates to an improved sand trap through which non-turbulent flow may be assured to cause settling of entrained said.

The water pumped from deep wells for distribution carries with it large amounts of entrained sand, and this sand must be removed before clean water can be distributed and used. Attempts have long been made to solve this removal problem but without reaching a satisfactory solution.

It is an object of the invention to provide an improved separator of very simple construction and fool proof operation.

Another object of the invention is to provide an improved and more efficient device for separating entrained granular particles such as sand from liquids such as water.

Another object of the invention is to provide an improved sand trap for separating sand and other suspended particles from water by settling.

Another object of the invention is to provide an improved sand trap through which non-turbulent flow of water containing entrained sand may be assured.

The invention will be best understood from a consideration of the following detailed description taken in connection with the accompanying drawings forming part of this specification, with the understanding, however, that the invention is not confined to any strict conformity with the showing of the drawings, but may be changed or modified so long as such changes or modifications mark no material departure from the salient features of the invention.

In the drawings:

FIG. 1 is a view mostly in elevation illustrating an embodiment of the invention, with certain parts of a water tank broken away and shown in section;

FIG. 2 is a view in cross section taken on line 2—2 of FIG. 1; and

FIG. 3 is a view in cross section taken on line 3—3 of FIG. 1.

Referring now to the drawings and particularly to FIG. 1, an upright cylindrical tank is shown having a side wall 5, a top wall 6, a bottom wall 7, a central outlet fitting 8 in top wall 6, and a central inlet fitting 9 in bottom wall 7. A side outlet (not shown and ordinarily capped off) may be provided and located in side wall 5 proximate bottom wall 7.

The apparatus of the instant invention designated as 10 in FIG. 1, may include a suspension tube 11, having a flange 12 and three outlet ports 13, 13a, and 13b, as more particularly shown in FIG. 2. The apparatus 10 may be attached to top wall 6 and fixedly positioned as shown by means of bolt fasteners 14.

Below and carried by the suspension tube 11, there may be provided a vertical cylindrical chamber 16, which may have a closed canopy top 15. Three lateral fins or baffles 17, 17a, and 17b may be provided and may be positioned and attached to the side wall of cylindrical chamber 16 in the manner shown in FIG. 3. As shown, fins 17, 17a, and 17b may be spaced apart radically, and it has been found preferable that they be spaced apart equidistant or 120°. Cylindrical chamber 16 may also have a lower laterally flared open end such as apron 18, as shown in FIGS. 1 and 3. Finally, a standpipe 19 may be carried by inlet fitting 9, and may be directed upwardly and into vertical cylindrical chamber 16.

In operation with the side outlet of the cylindrical tank capped off, water including entrained sand may enter chamber 16 through standpipe 19, and may continue upward to be deflected downward by the inside wall of canopy 15. As shown schematically, the liquid flow will generally follow the path shown, downward from the canopy 15, thence under apron 18, thence upward, and then as shown through ports 13, 13a, and 13b and out central outlet 8 in top wall 6.

It has been found that the construction of the apparatus of the instant invention is effective to assure a non-turbulent flow of liquid through the apparatus. Since the liquid flow is slowed and stilled, entrained sand will tend to settle by gravity and will accumulate on the bottom of the tank.

In the course of the water flow through the tank, certain quantities of entrained sand may tend to settle on the tops of the canopy 15 and the apron 18, but from time to time this settled sand will slide off or be washed off and settle to the bottom of the tank.

It is obvious that it is a simple matter to remove the sand that has settled in the bottom of the tank by backwashing, which will also be effective to clean the entire inside of the tank.

While the present invention has been disclosed in connection with a specific embodiment thereof, it is to be understood that this is by way of example rather than by way of limitation, and that the invention is to be defined by the attendant claims which should be given a scope as broad as is consistent with the prior art.

What is claimed is:
1. An apparatus for separating entrained sand from water, including in combination: a vertical cylindrical tank having a top wall with a central outlet for clear sand-free water, a bottow wall with a central inlet for water containing entrained sand, and a side wall with a lower outlet for sand slurry; a suspension tube having equally spaced apart lateral ports and flange means for fixing said suspension tube to the top wall of said tank; a vertical cylindrical chamber below said suspension tube defined by a closed top member describing a canopy cover, and a lower laterally flared open-ended member describing an apron; a plurality of lateral fins spaced apart equally from one another and extending downwardly from said canopy cover to a point below said apron, said fins extending laterally to less than one inch from said side wall of said vertical cylindrical tank; and a standpipe directed upwardly and into said vertical cylindrical chamber from said central inlet in said bottom wall of said cylindrical tank.

2. An apparatus for separating entrained sand from water, including in combination: a vertical cylindrical tank having a top wall with a central outlet for clear sand-free water, a bottom wall with a central inlet for water containing entrained sand, and a side wall with a lower outlet for sand slurry; a suspension tube having three lateral ports spaced apart from one another 120°, and flange means for fixing said suspension tube to the top wall of said tank; a vertical cylindrical chamber below said suspension tube defined by a closed top member describing a canopy cover, and a lower laterally-flared open-ended member describing an apron; three lateral fins spaced apart from each other 120° and extending downwardly from said canopy cover to a point below said apron, said fins extending laterally to less than one inch from said side wall of said vertical cylindrical tank; and a standpipe directed upwardly and into said vertical cylindrical chamber from said central inlet in said bottom wall of said cylindrical tank.

References Cited

FOREIGN PATENTS 750,198  6/1956  Great Britain.

REUBEN FRIEDMAN, *Primary Examiner.*

J. DE CESARE, *Assistant Examiner.*